Nov. 9, 1937.  E. E. HARRIS  2,098,803
ELASTIC FLUID TURBINE ARRANGEMENT
Filed Jan. 15, 1936
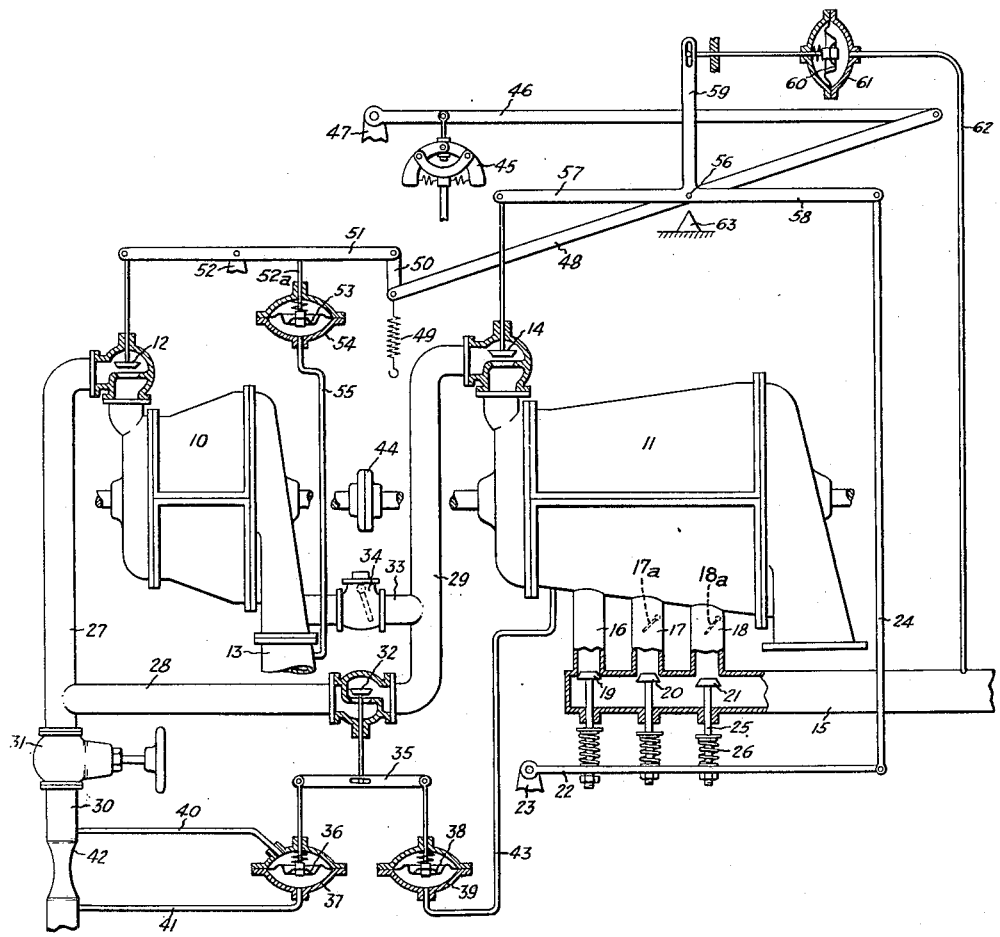
Inventor:
Eugene E. Harris,
by Harry E. Dunham
His Attorney.

Patented Nov. 9, 1937

2,098,803

UNITED STATES PATENT OFFICE 2,098,803

ELASTIC FLUID TURBINE ARRANGEMENT

Eugene E. Harris, Watervliet, N. Y., assignor to General Electric Company, a corporation of New York Application January 15, 1936, Serial No. 59,263

8 Claims. (Cl. 60—67)

The present invention relates to elastic fluid turbine arrangements, more specifically to the type in which two turbines are provided for furnishing a common mechanical load with one of the turbines provided with extraction stages for supplying elastic fluid at a definite pressure or pressures.

The object of my invention is to provide an improved construction and arrangement for such turbines and their governing mechanisms whereby they may be operated more economically at low load condition. This is accomplished in accordance with my invention by the provision of means for connecting the turbines in parallel at normal and high load conditions and for connecting them in series at low load condition. The change from parallel connection to series connection is preferably accomplished by an automatic governing mechanism.

For a consideration of further objects and of what I believe to be novel and my invention, attention is directed to the following description and the claims appended thereto in connection with the accompanying drawing.

The single figure of the drawing illustrates a somewhat diagrammatic view embodying my invention. The view has been simplified by the omission of hydraulic relays and motors usually provided in governing mechanisms.

The arrangement comprises a first or high pressure turbine 10 and a second or low pressure turbine 11. The first turbine is a noncondensing turbine having an inlet valve 12 for controlling the flow of elastic fluid therethrough and an exhaust connected to a conduit 13 for conducting the exhaust fluid to a consumer. The second turbine 11 is an extraction turbine having an inlet valve 14 for conducting the flow of elastic fluid thereto and provided with extraction means for extracting elastic fluid therefrom and conducting it to a consumer. The extraction means in accordance with my invention comprises a conduit 15 which has branches 16, 17, and 18 connected to different stages of the turbine. In the present instance the branch 16 is connected to a high pressure stage, the branch 17 to an intermediate pressure stage and the branch 18 to a low pressure stage. The branches 17 and 18 include check valves 17a and 18a to prevent back flow of fluid. The flow through the conduits 16, 17, and 18 is controlled by valves 19, 20, and 21, respectively, which have stems connected to a lever 22. The latter has a left-hand end held on a fulcrum 23 and a right-hand end pivotally connected to a link 24. Each valve has a stem 25 slidably projecting through an opening in the lever 22 and biased towards closing position by a spring 26. The arrangement is such that during opening movement; that is, downward turning movement of the lever 22, at first the valve 21 is opened, thereafter the valve 20, and finally the valve 19. Similarly during closing movement; that is, upward turning movement of the lever 22, the valves are closed successively, the high pressure valve 19 being closed first and the low pressure valve 21 last.

Another important feature of my invention, as stated above, is the provision of means for connecting the turbines in parallel at normal and high load and in series during low load condition. This means comprises a conduit 27 for conducting high pressure elastic fluid to the first turbine 10 and conduits 28, 29 for conducting high pressure elastic fluid to the second turbine 11. The inlets to conduits 27, 28 are connected by a conduit 30 including an emergency valve 31 to a source of supply or an elastic fluid generator, not shown. The conduits 28, 29 are connected by a valve 32. The conduit 29 is connected by a conduit 33 including a nonreturn valve 34 to the exhaust of the first turbine 10. The turbines are connected in parallel by opening of the valve 32 and closing of the nonreturn valve 34 and the turbines are connected in series by closing of the valve 32 and opening of the nonreturn valve 34. In the latter case high pressure elastic fluid is conducted to the first turbine 10. A part of the fluid exhausted therefrom is discharged through the conduit 13 to a consumer and another part is discharged through the conduit 33 into the conduit 29, whence it is conducted to the second turbine 11. Opening and closing of the valve 34 is effected automatically. As soon as valve 32 is closed, the pressure in the conduit 29 decreases, effecting automatic opening of the valve 34 by the exhaust pressure of the first turbine 10 and vice versa, when the valve 32 is opened, high pressure elastic fluid is conducted to the conduit 29, which automatically causes the valve 34 to close. The valve 32 has a stem connected to an intermediate point of a floating lever 35. The left-hand end of this lever is connected to a diaphragm 36 of a flow-responsive device 37 and the right-hand end of the lever 35 is connectd to a diaphragm 38 of a pressure-responsive device 39. The flow-responsive device has pipes 40 and 41 connected to opposite sides of a restriction or orifice 42 in the conduit 30 in such manner that the diaphragm 36 is moved in response to changes in flow of elastic fluid through the conduit 30. The pressure-responsive device 39 is connected by a pipe 43 to the first stage pressure of the second turbine 11. During normal operation the turbines are connected in parallel. If now the flow of fluid through the conduit 30 decreases, the flow-responsive device 36 moves the left-hand end of the lever 35 downward until at a certain minimum flow the valve 32 is closed and the turbines thereby connected in series, the nonreturn or check valve 34 opening automatically, as stated above. If now, with the turbines connected in series, more load output is required than is possible to obtain from the series flow through the high pressure turbine 10 and the second turbine 11, which now acts as a low pressure turbine, the pressure-responsive device 39 effects opening of the valve 32 because under such condition the first stage shell pressure of the second turbine 11 rises and causes upward movement of the diaphragm 38, resulting in upward movement of the right-hand end of the lever 35 and consequent opening of the valve 32. As soon as the valve 32 is opened the nonreturn valve 34 is closed by the rise in pressure in the conduit 29 and the turbines are operated in parallel. The rise of the shell pressure of the second turbine 11 during increased demand for load output is effected by the opening movement of the inlet valve 14 as will be described more fully hereinafter.

The valves 34 and 32, together with the flow and pressure-responsive devices for moving the latter, represent means for automatically connecting the turbines from series to parallel and vice-versa in response to certain load conditions.

There are three variables causing a change in demand for elastic fluid, namely, the demand for exhaust elastic fluid from the noncondensing turbine 10, it being desirable to maintain the pressure in the exhaust conduit 13 constant, second, a change in demand for extraction elastic fluid from the second turbine 11, it being desirable to maintain the pressure in the extraction conduit 15 constant, and third, a change in demand for mechanical load output from both turbines. Two turbines have shafts mechanically connected by a coupling 44 to furnish a common mechanical load output. In addition to the aforementioned control mechanism, a governing mechanism is provided for controlling the inlet valves 12 and 14 of the first and second turbines respectively and the extraction valves 19, 20, 21 of the second turbine in such manner that under normal conditions any of said variables may be satisfied without effecting a change of the other variables. For example, by properly positioning said valves, the mechanical load output may be changed to meet the required demand without thereby affecting the fluid pressures in the exhaust conduit 13 and the extraction conduit 15. A change in demand for extraction fluid from the second turbine may be satisfied without thereby effecting a change in the exhaust pressure of the first turbine or a change of the total mechanical load output of both turbines.

More specifically, the governing mechanism for operating the inlet valves 12, 14 and the extraction valves 19, 20, 21 comprises a device responsive to the mechanical load output of the two turbines, in the present instance shown as a speed-responsive device or flyball governor 45, driven from the turbine shaft and pivotally connected to a lever 46 which has a left-hand end held on a fulcrum 47 and a right-hand end connected to a lever 48. The latter has a left-hand end biased downward by a spring 49 and pivotally connected by a link 50 to the right-hand end of a lever 51 held on a fulcrum 52. The left-hand end of the lever 51 is connected to the inlet valve 12 for the first turbine 10. The right-hand portion of the lever 51 bears against a stem 52a which is secured to a diaphragm 53 of a pressure-responsive device 54 having a pipe 55 connected to the exhaust conduit 13 of the first turbine 10. The lever 51 is normally biased into contact with the stem 52a by the action of the spring 49. An intermediate point of the lever 48 is pivotally connected to the common point 56 of a three-arm lever. The latter has a first arm 57 connected to the inlet valve 14 of the second turbine 11, a second arm 58 connected through the aforementioned link 24 to the lever 22 for controlling the valves 19, 20, 21 and a third or upright arm 59 connected to a diaphragm 60 of a pressure-responsive device 61 communicating by a pipe 62 with the extraction conduit 15.

During parallel operation of the turbines, the operation of the governing mechanism is as follows: Let us assume the desired pressure for exhaust elastic fluid from the noncondensing turbine 10 to be 150 lbs. and the desired pressure for extraction elastic fluid from the second or condensing turbine 11 to be 10 lbs. If now at constant demand for mechanical load output and constant demand for exhaust elastic fluid from the turbine 10 the demand for extraction elastic fluid from the turbine 11 increases, the pressure in the conduit 15 will drop. This causes through the pressure-responsive device 61 turning movement of the three-arm lever in clockwise direction about its common point 56, resulting in opening movement of the inlet valve 14 and opening movement of the extraction valves 19, 20, 21. Depending upon the position of the latter and the rate of change, it may be that valve 21 only is opened or that two or all of these valves are opened. Opening of the extraction valves is continued until the increased demand for extraction elastic fluid is satisfied; that is, constant pressure, in the present example 10 lbs., is again established in the conduit 15. Under this condition, the valve 14 is opened sufficiently to satisfy the increased demand for extraction elastic fluid without thereby causing a change in the mechanical load output of the second turbine 11. The increased flow of elastic fluid through the first stages of the second turbine under this condition causes an increase in mechanical load output of these stages but the increased opening of the extraction valves 19 to 21 causes a corresponding decrease in mechanical load output of the stages succeeding the corresponding extraction valves. The flow and consequently the mechanical load output through the first turbine 10 remains unaffected. Hence, the pressure in the exhaust conduit 13 and the total mechanical load output of the two turbines remain constant. If the demand for extraction elastic fluid decreases, the pressure in the conduit 15 rises, causing similar movements of the inlet valve 14 and the extraction valves 19 to 21 but in opposite direction until the desired pressure in the conduit 15 is re-established.

Let us now assume a change in demand for exhaust elastic fluid from the noncondensing turbine 10 at constant demand for mechanical load output and extraction elastic fluid from the second turbine 11. Increase in demand for elastic fluid from the conduit 13 causes a drop in pressure therein. This drop in pressure causes the diaphragm 53 of the pressure-responsive device 54 to move downward and effect clockwise turning movement of the lever 51 about its fulcrum 52 by the action of the tension spring 49. The left-hand end of the lever 52 thereby is moved upward, causing opening movement of the inlet valve 12 and consequently increased flow of elastic fluid to the first turbine 10 until the desired pressure, in the present example 150 lbs., is re-established in the exhaust conduit 15. The increased flow of elastic fluid through the turbine 10 causes an increased mechanical load output thereof. This increase in load output is compensated by a corresponding decrease in load output of the second turbine 11. As will be noted, the clockwise turning movement of the fulcrumed lever 51 effects through the link 50 downward movement of the left-hand end of the lever 48. The latter then turns about its right-hand end connection with the governor lever 46 and causes parallel downward movement of the three-arm lever, resulting in closing movement of the inlet valve 14 and opening movement of the extraction valves 19 to 21 of the second turbine. Closing of the inlet valve 14 of the second turbine under this condition reduces the flow of elastic fluid through the second turbine and consequently the mechanical load output thereof, the arrangement being such that the decrease in mechanical load output equals the increase in mechanical load output of the first turbine 10. Increased opening of the extraction valves 19 to 21 under reduced flow conditions through the second turbine assures the maintenance of constant pressure in the extraction conduit 15. The operation of the mechanism in response to a decrease in demand for exhaust elastic fluid from the exhaust conduit 13 of the first turbine 10 is similar except that the different elements move in opposite directions.

Let us now assume the demand for exhaust elastic fluid from the first turbine 10 and of extraction fluid from the second turbine 11 remain constant. An increase in demand for mechanical load output, under such condition, causes the flyweights of the speed governor to move together and thereby raise the lever 46. The latter then turns upward about the fulcrum 47 and causes upward turning movement of the lever 48 about its left-hand end connection with the link 50, resulting in parallel upward movement of the three-arm lever effecting opening movement of the inlet valve 14 and closing movement of the extraction valves 19, 20, 21 of the second turbine 11. This increases the flow of elastic fluid through the second turbine 11 without changing the pressure in the extraction conduit 15, thereby increasing the mechanical load output. The maximum mechanical load output is obtained under such condition by fully opening the valve 14. The magnitude of this maximum output is equal to that obtainable by the turbine 11 plus the mechanical load output obtainable from the turbine 10 at the required demand for exhaust elastic fluid of the latter. During decrease in demand for mechanical load output the speed of the turbines increases, causing downward turning movement of the lever 46 which effects downward turning movement of the lever 48 about its connection with the link 50, resulting in closing movement of the inlet valve 14 and opening of the extraction valves 19, 20, and 21 of the second turbine. As the mechanical load output decreases further, the valve 14 is moved further towards its closing position to a point and beyond the point at which it is no longer possible to maintain the desired pressure in the extraction conduit 15 until finally the valve 14 is completely shut. If under such condition the demand for mechanical load output drops further, it is desirable to close the inlet valve of the first turbine 10. The means for effecting this in addition to the above described governing mechanism includes a stop 63 provided below the common point 56 of the three-arm lever in co-operative relation with the lever 48. The arrangement is such that the lever 48 engages the stop 63 as soon as the valve 14 is shut. If under such condition, a further decrease in demand for mechanical load output takes place, the stop 63 acts as a fulcrum for the lever 48 whereby further downward movement of the right-hand end of the lever 48 causes corresponding upward movement of the left-hand end of the lever 48, to the effect that lever 51 is turned counterclockwise about the fulcrum 52 and causes closing movement of the valve 12. Thus, as the load decreases beyond a certain point, the speed governor first takes control of the second turbine 11 and thereafter of the first turbine 10, rendering the pressure-responsive device 54 for the first turbine 10 inoperative. In order to meet the last-named condition, the pressure-responsive device 54 is connected to the lever 51 in such a way that it can be readily divorced from the lever when the speed governor takes control of the first turbine.

During series operation of the turbines, that is, with the extraction turbine 11 receiving exhaust elastic fluid from the noncondensing turbine, the operation of the governing mechanism is as follows: Let us assume that the demand for extraction elastic fluid from the second turbine 11 increases at constant demand for exhaust elastic fluid from the first turbine 10 and constant mechanical load output. The increase in demand for extraction elastic fluid causes a drop in pressure in the extraction conduit 15 whereby the pressure-responsive device 61 causes clockwise turning movement of the three-arm lever about its common point 56, thereby opening the inlet valve 14 and also the extraction valves 19, 20, 21. So far, the operation under such condition is the same as before with the turbines operated in parallel. Under the present condition, however, with the turbines connected in series, opening of the inlet valve 14 of the second turbine increases the flow of elastic fluid from the first turbine 10 to the second turbine and thereby effects a drop in pressure in the exhaust conduit 13. This drop in pressure is compensated by an increased opening of the inlet valve 12 of the first turbine 10 under the action of the pressure-responsive device 54. Opening of the valve 12 is continued until the desired pressure in the exhaust conduit 13 is re-established. The increased flow through the first turbine 10 causes an increase in mechanical load output which is compensated by a corresponding decrease of the mechanical load output of the second turbine 11. A decrease in the exhaust pressure effects downward movement of the right-hand end of the lever 51 which causes the lever 48 to move downward about its pivot connection with the lever 46, resulting in closing movement of the inlet valve 14 and opening movement of the extraction valves 19 to 21 of the second turbine. These different movements of the mechanism do not take place consecutively but the movements overlap each other, taking place at least partly simultaneously. During a decrease in demand for extraction elastic fluid causing an increase in pressure in the extraction conduit 15 of the second turbine, the operation of the mechanism is substantially the same except that the different elements are moved in opposite directions as described above.

The operation of the governing mechanism in response to a change in demand for exhaust elastic fluid causing a change in pressure in the exhaust conduit 13 of the first turbine is the same as described above with regard to the parallel operation of the turbines.

An increase in demand for mechanical load output at constant demand for exhaust and extraction elastic fluid causes a decrease in speed whereby the flyballs of the speed governor are moved inward and effect upward turning movement of the lever 46 about its fulcrum 47. The lever 48 thereby is moved upward about its pivot connection with the link 50, causing parallel upward movement of the three-arm lever and consequently opening of the inlet valve 14 and closing movement of the extraction valves 19, 20, 21. This increases the flow of elastic fluid through the second turbine 11 and consequently its mechanical load output without altering the pressure in the extraction conduit 15. Opening of the valve 14 in turn causes a decrease in pressure in the extraction conduit 13 which is compensated by an opening movement of the inlet valve 12 of the first turbine 10 by the action of the pressure governor 54. The operation of the mechanism in this respect is similar to the one described above in connection with an increase in demand for extraction elastic fluid from the conduit 15. Again the different movements overlap each other and continue until the desired condition is attained. A decrease in demand for mechanical load output causes similar movement except that the different elements are moved in opposite direction. If the demand for mechanical load output drops below a certain value, it is no longer possible to satisfy the demand for extraction fluid from the second turbine 11, preference in this respect being given to the maintenance of the pressure of the exhaust fluid from the first turbine 10. If the demand for mechanical load output decreases further after the valve 14 is shut and the lever 48 is engaged by the stop 63, the exhaust pressure in the conduit 13 can no longer be maintained in that the inlet valve of the first turbine is moved towards closing position by the action of the governor 45. In this case, the control of the first turbine is taken over completely by the speed governor and the pressure-responsive device 54 is rendered inoperative.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. An elastic fluid turbine arrangement including the combination of a first and a second turbine for furnishing a common load output, means for connecting the turbines in series and in parallel as regards the flow of elastic fluid therethrough, and means for automatically changing the connection from series to parallel connection as the load output rises beyond a fixed value.

2. An elastic fluid turbine arrangement including the combination of a first turbine and a second turbine having shafts coupled together, means for conducting high pressure elastic fluid to the inlets of both turbines, and means for automatically connecting the second turbine to the exhaust of the first turbine as the total mechanical load output of the two turbines reaches a certain minimum value.

3. An elastic fluid turbine arrangement including the combination of a noncondensing turbine having an inlet valve and an exhaust conduit for conducting exhaust fluid to a consumer at a definite pressure, an extraction turbine having an inlet valve and extraction conduit, means connected thereto for conducting extraction elastic fluid at a definite pressure to a consumer, and means for connecting the two turbines in series and in parallel as regards the flow of elastic fluid therethrough, said means including a mechanism for automatically changing from parallel to series connection as the load reaches a certain minimum value.

4. An elastic fluid turbine arrangement including the combination of a noncondensing turbine, an extraction turbine, each turbine having an inlet valve, means for normally controlling the flow of high pressure elastic fluid to the inlets of both turbines, means for conducting a part of the exhaust fluid of the noncondensing turbine to the inlet of the extraction turbine at low load condition and simultaneously interrupting the flow of high pressure elastic fluid to the extraction turbine, and a governing mechanism for automatically controlling the inlet valves in response to changes in demand for total mechanical load output of the two turbines and the exhaust pressure of the noncondensing turbine and the extraction pressure of the extraction turbine.

5. An elastic fluid turbine arrangement including the combination of a noncondensing turbine having an inlet valve for controlling the flow of high pressure elastic fluid therethrough, an extraction turbine having an inlet valve for controlling the flow of elastic fluid therethrough, a conduit including a nonreturn valve for connecting the extraction turbine in series with the exhaust of the noncondensing turbine, another conduit including a control valve for connecting the extraction turbine in parallel with the noncondensing turbine, and means for positioning the control valve comprising a device responsive to load conditions on the turbines.

6. An elastic fluid turbine arrangement including the combination of a noncondensing turbine having an inlet valve for controlling the flow of high pressure elastic fluid therethrough, an extraction turbine having inlet and extraction valve means, a conduit including a nonreturn valve connecting the extraction turbine in series with the exhaust of the noncondensing turbine, another conduit including a control valve for connecting the extraction turbine in parallel with the noncondensing turbine, and means for positioning the control valve comprising a device responsive to the flow of elastic fluid to both turbines and another device responsive to a high stage shell pressure of the extraction turbine.

7. An elastic fluid turbine arrangement including the combination of a noncondensing turbine having an inlet valve, an extraction turbine having an inlet valve, a first conduit for conducting high pressure elastic fluid to the noncondensing turbine, a second conduit connected between the first conduit and the extraction turbine for conducting high pressure elastic fluid to the latter, a third conduit including a check valve for conducting exhaust elastic fluid from the noncondensing turbine to the extraction turbine, means including a valve in the second conduit and devices responsive to the flow of elastic fluid to the turbines and to the pressure within the extraction turbine for automatically connecting the two turbines in series and in parallel as regards the flow of elastic fluid therethrough, an extraction conduit having branches connected to separate stages of the extraction turbine, valve means in said branches for controlling the flow of extraction fluid, means including a three-arm lever and a pressure-responsive device responsive to fluid conditions in the extraction conduit to automatically position the extraction valve means in response to changes in demand for extraction fluid, means including another pressure-responsive device subject to the exhaust pressure of the noncondensing turbine to control the flow of elastic fluid to the noncondensing turbine in response to exhaust pressure changes and simultaneously to position the inlet and extraction valve means of the extraction turbine to maintain constant the total mechanical load output of the two turbines, and a speed-governing mechanism to control the inlet and extraction valve means in response to changes in demand for mechanical load output without changing the exhaust pressure of the noncondensing turbine and the extraction pressure of the extraction turbine.

8. An elastic fluid turbine arrangement including the combination of a high pressure turbine having an inlet valve, means for controlling the valve in response to changes in demand for mechanical load output, an extraction turbine having an inlet with a valve connected to a lower stage of the high pressure turbine, and means for controlling the last named valve in response to changes in flow of elastic fluid through the high pressure turbine.

EUGENE E. HARRIS.